(12) United States Patent
Lee et al.

(10) Patent No.: US 8,057,710 B2
(45) Date of Patent: Nov. 15, 2011

(54) COMPOSITE FOR ELECTRODE ACTIVE MATERIAL AND SECONDARY BATTERY COMPRISING THE SAME

(75) Inventors: Yongju Lee, Daejeon (KR); Insung Uhm, Daejeon (KR); Seungyoun Choi, Daejeon (KR); Jeyoung Kim, Daejeon (KR); Dong Sub Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/773,516

(22) Filed: May 4, 2010

(65) Prior Publication Data

US 2010/0243964 A1 Sep. 30, 2010

Related U.S. Application Data

(63) Continuation of application No. PCT/KR2010/001942, filed on Mar. 30, 2010.

(30) Foreign Application Priority Data

Mar. 30, 2009 (KR) .......................... 10-2009-0027063

(51) Int. Cl.
*H01B 1/08* (2006.01)

(52) U.S. Cl. .................... 252/518.1; 252/514; 252/516; 429/218.1

(58) Field of Classification Search .......... 252/512–514, 252/516, 518.1; 429/218.1
See application file for complete search history.

(56) References Cited

U.S. PATENT DOCUMENTS

| | | | |
|---|---|---|---|
| 6,824,921 B2 * | 11/2004 | Sato et al. .................. | 429/218.1 |
| 7,169,328 B2 * | 1/2007 | Miller et al. .................. | 252/500 |
| 7,378,041 B2 * | 5/2008 | Asao et al. .................. | 252/521.3 |
| 7,435,509 B2 * | 10/2008 | Thackeray et al. ........... | 429/219 |
| 2005/0042128 A1 * | 2/2005 | Matsubara et al. ............. | 419/66 |
| 2009/0199779 A1 * | 8/2009 | Parks ............................ | 119/247 |

* cited by examiner

*Primary Examiner* — Mark Kopec
(74) *Attorney, Agent, or Firm* — Birch, Stewart, Kolasch & Birch, LLP

(57) ABSTRACT

Disclosed are a composite which can be used as an electrode active material for a secondary battery, and the secondary battery comprising the same. The composite includes: a first material selected from the group consisting of metals and metalloids capable of being reversibly alloyed with lithium; a second material selected from the group consisting of metals incapable of being alloyed with lithium, compounds containing the metals, and compounds containing metals or metalloids capable of being irreversibly alloyed with lithium; and a third material which is at least one kind of metal having a higher electrical conductivity than the second material, wherein a content of the third material ranges from 10 to 10,000 ppm based on the total weight of the composite.

11 Claims, 2 Drawing Sheets

COMPOSITE FOR ELECTRODE ACTIVE MATERIAL AND SECONDARY BATTERY COMPRISING THE SAME

CROSS REFERENCE TO RELATED APPLICATIONS

This application is a Continuation of PCT International Application No. PCT/KR2010/001942 filed on Mar. 30, 2010, which claims the benefit of Patent Application No. 10-2009-0027063 filed in the Republic of Korea, on Mar. 30, 2009. The entire contents of all of the above applications are hereby incorporated by reference.

TECHNICAL FIELD

The present invention relates to a composite that can be used as an electrode active material for a secondary battery, and the secondary battery comprising the composite.

BACKGROUND ART

There has been recently increasing interest in energy storage technology. As electrochemical devices have been widely used as energy sources in portable phones, camcorders, notebook PCs and electric cars, an effort on research and development of the electrochemical devices has been gradually actualized. In this regard, electrochemical devices are the subject of great interest. Particularly, development of rechargeable secondary batteries has been the focus of attention. Also, in developing such batteries, research on the design of a novel electrode and battery has been recently conducted in order to improve capacity density and specific energy.

Among the currently used secondary batteries, lithium secondary batteries, developed in early 1990's, are spotlighted because they generally have a high operating voltage and a considerably high energy density, compared to conventional batteries using aqueous electrolytes (such as Ni-MH batteries, Ni—Cd batteries, $H_2SO_4$—Pb batteries, etc.).

A lithium secondary battery is generally manufactured by employing materials capable of intercalating/deintercalating lithium ions as a cathode and an anode, and filling an organic electrolyte or a polymer electrolyte between the cathode and the anode. A lithium secondary battery generates electrical energy by an oxidation reaction and a reduction reaction when the lithium ions are intercalated and deintercalated from the cathode and the anode.

At present, as an electrode active material constituting the anode of the lithium secondary battery, a carbonaceous material is mainly used. However, in order to further improve the capacity of the lithium secondary battery, it is necessary to use a high capacity electrode active material.

In order to satisfy this requirement, for example, some metals (such as Si, Sn, or the like) which show a higher charge/discharge capacity than the carbonaceous material and can be electrochemically alloyed with lithium may be used as an electrode active material. However, such a metal-based electrode active material is subjected to a significant volume change according to the charge/discharge of lithium so that the metal-based electrode active material is cracked and pulverized. Thus, a secondary battery using such a metal-based electrode active material has problems, such as a sudden reduction in a capacity, and a reduction in a cycle life, as a charge/discharge cycle is repeated.

Accordingly, in order to complement cracks and pulverization occurring during use of the metal-based electrode active material, there has been suggested the use of a composite including a metal, such as Si, Sn, or the like, and oxide thereof as an electrode active material. However, the electrode active material employing the composite shows a high life characteristic and a high thickness controlling capability due to the metal oxide inhibiting cracks and pulverization of a metal, compared to the above mentioned metal-based electrode active material, while the improved extent is not much higher than expected.

DISCLOSURE

Technical Problem

The inventors of the present invention have found that it is possible to prepare a composite having a high battery life characteristic and a high electrode thickness controlling capability when the composite comprises: a first material selected from the group consisting of metals and metalloids capable of being reversibly alloyed with lithium; a second material selected from the group consisting of metals incapable of being alloyed with lithium, compounds containing the metals, and compounds containing metals or metalloids capable of being irreversibly alloyed with lithium; and a third material which is at least one kind of metal having a higher electrical conductivity than the second material, wherein a content of the third material ranges from 10 to 10,000 ppm based on the total weight of the composite. This is because such a composite improves the entire electrical conductivity of an electrode active material and thereby allows the volume of a battery to be uniformly changed during the charge/discharge. The present invention is based on this finding.

Technical Solution

The present invention provides a composite comprising: a first material selected from the group consisting of metals and metalloids capable of being reversibly alloyed with lithium; a second material selected from the group consisting of metals incapable of being alloyed with lithium, compounds containing the metals, and compounds containing metals or metalloids capable of being irreversibly alloyed with lithium; and a third material which is at least one kind of metal having a higher electrical conductivity than the second material, wherein a content of the third material ranges from 10 to 10,000 ppm based on the total weight of the composite.

Also, the present invention provides an electrode active material comprising the composite, and a secondary battery comprising the electrode active material.

BRIEF DESCRIPTION OF THE INDICATION

1: a first material,
2: a second material,
3: a third material,

10: a core,
20: a carbon layer

DISCLOSURE OF THE INVENTION

Hereinafter, the present invention will be explained in more detail.

A conventional composite which includes a first material (ex. Si, or the like) selected from the group consisting of metals and metalloids capable of being reversibly alloyed with lithium; and a second material (ex. $SiO_2$, SiCo, Co, or the like) selected from the group consisting of metals incapable of being alloyed with lithium, compounds containing the metals, and compounds containing metals or metalloids capable of being irreversibly alloyed with lithium, has been used as an electrode active material for a secondary battery, especially as an anode active material, because the second material within the composite, in the vicinity of the first material, can inhibit a change in a volume of the first material during the charge/discharge of the battery.

The secondary battery using the composite as an electrode active material shows a high battery life characteristic and a high electrode thickness controlling capability, compared to another secondary battery using only the first material as an electrode active material, but the improved extent is not much higher than expected.

The inventors of the present invention thought that this is because the electrical conductivity of the second material region is low.

Specifically, the second material region within the electrode active material has a relatively low electrical conductivity compared to the first material region, and thus inhibits lithium ions ($Li^+$) and electrons from smoothly moving to the first material. Accordingly, there exists a portion within the electrode active material, where the movement of lithium ions and electrons is relatively easy, and another portion where it is relatively difficult. The electrochemical reaction between lithium ions/electrons and an electrode active material mainly occurs in the portion where the movement of the lithium ions and the electrons is easy. As described above, the electrochemical reaction non-uniformly occurs, resulting in a non-uniform change in a volume of the electrode active material. This causes cracks and pulverization of the electrode active material and thus reduces an electrode thickness controlling capability, resulting in a reduction in a life characteristic of a battery.

The inventors of the present invention intended to use a metal or a metalloid which has been known to have a high electrical conductivity in the art so as to improve the electrical conductivity within a conventional electrode active material. However, a metal or a metalloid capable of being reversibly alloyed with lithium (such as aluminum (Al)) may cause cracks or pulverization in an electrode active material during the charge/discharge of a battery.

Figure 1:
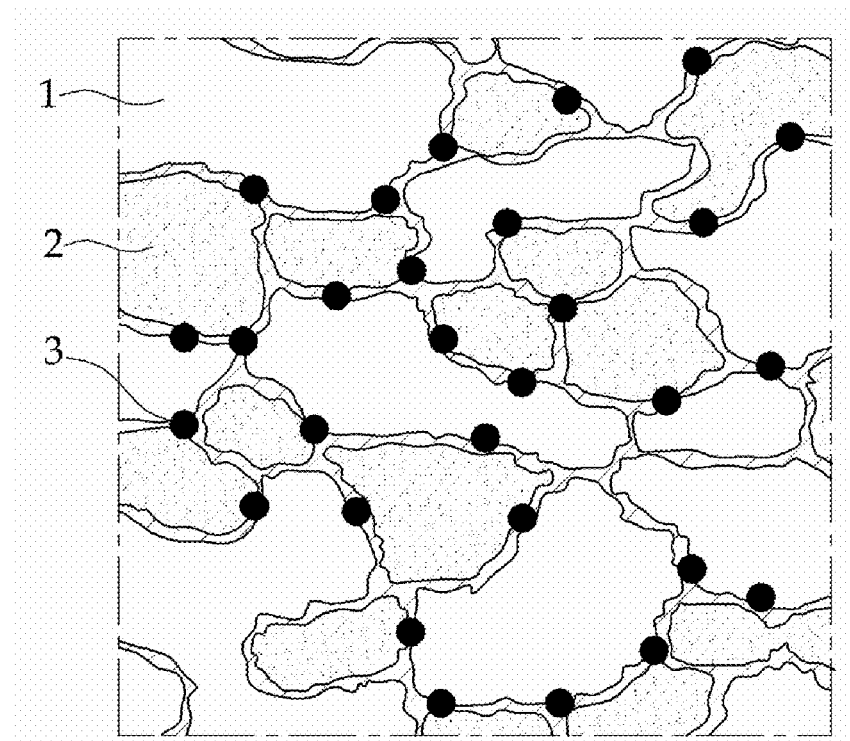
FIG. 1 is a view schematically showing a composite according to the present invention.

Accordingly, as shown in FIG. 1, a composite according to the present invention includes not only the first material (1); and the second material (2), but also a third material (3) which is a metal having a higher electrical conductivity than the second material. Compared to a conventional composite including only the first material and the second material, the composite according to the present invention can improve the electrical conductivity of an electrode active material, reduce a change in an electrode thickness, and further improve a life characteristic of a battery.

However, in a case where the third material is included in an amount of less than about 10 ppm based on the total weight of the composite, the electrical conductivity of the electrode active material is not much higher than that of another case where the third material is not included. Besides, since a very high purity treatment is required, the cost for a raw material is increased. Also, in a case where the third material is included in an amount of greater than about 10,000 ppm based on the total weight of the composite, the third material existing in the surface of the electrode active material may be exposed to the electrolyte, thereby causing catalysis in decomposition of the electrolyte.

In view of the above-mentioned problems, the present invention is characterized by adjusting a content of the third material to a range from about 10 to 10,000 ppm based on the total weight of the composite, preferably in an amount within a range of from about 10 to 5,000 ppm. Such a composite according to the present invention may be a multi-component composite containing at least three components, and preferably may be a three-component composite or a four-component composite.

1. A Composite and a Preparation Method of the Same

There is no limitation in a first material that may be used in the composite according to the present invention, as long as it is a metal or a metalloid capable of being reversibly alloyed with lithium. Non-limiting examples of the first material may include metals or metalloids selected from groups 13 and 14 of the Periodic Table.

Specifically, non-limiting examples of the first material include metals or metalloids, such as Si, Al, Sn, Sb, Bi, As, Ge, Pb, and the like. These may be used alone or in the form of a mixture of two or more thereof.

Also, there is no limitation in a second material that may be used for inhibiting a volume change of the first material, in the vicinity of the first material, as long as its volume is not continuously expanded by a reaction with lithium during the charge/discharge of a battery.

Examples of the second material include: metals incapable of being alloyed with lithium, and compounds containing the metals; compounds containing metals capable of being irreversibly alloyed with lithium; and compounds containing metalloids capable of being irreversibly alloyed with lithium.

Specific examples of the second material may include materials which do not electrochemically react with lithium ions ($Li^+$), as described below, but the present invention is not limited thereto:
(a) $M^1M^2$ such as $CO_2Si$, CoSi, $CoSi_2$, or the like;
(b) a nitride containing at least one of $M^1$ and $M^2$;
(c) a boron compound containing at least one of $M^1$ and $M^2$;
(d) a fluoride containing at least one of $M^1$ and $M^2$;
(e) a phosphide containing at least one of $M^1$ and $M^2$;
(f) a sulfide containing at least one of $M^1$ and $M^2$;
(g) an $M^2$ containing oxide, such as MgO, CaO, $Li_2O$, or the like;
(h) an oxide containing $M^1$ and Li, such as Li—Si—O.

$M^1$ denotes at least one metal or metalloid capable of being electrochemically alloyed with lithium. Preferably, $M^1$ may be a metal or a metalloid selected from groups 13 and 14 of the Periodic Table. More preferably, $M^1$ may be Si, Al, Sn, Sb, Bi, As, Ge, Pb, or the like.

$M^2$ denotes at least one metal incapable of electrochemically alloyed with lithium, and may be a metal selected from alkaline earth metals and transition metals of the Periodic Table. Specifically, $M^2$ may be Mg, Ca, Sc, Ti, V, Cr, Mn, Co, Ni, Cu, Fe, Li, Zn or the like.

Another example of the second material is a material (such as an $M^1$ containing oxide) which inserts lithium ions at initial charge of a battery and then does not electrochemically react with lithium ions any longer. Herein, $M^1$ is the same as described above. For example, when $SiO_2$ is contained in the composite, $SiO_2$ electrochemically reacts with lithium ions ($Li^+$) at the initial charge, unlike other oxides not electrochemically reacting with lithium ions, such as MgO, CaO, $Li_2O$, Li—Si—O, or the like. As a result, $SiO_2$ inserts lithium ions, thereby forming lithium oxide or lithium metal oxide. Since the formed lithium oxide or lithium metal oxide is irreversible, the electrochemical reaction with lithium ions does not occur any longer after the initial charge.

This kind of second material may surround the above described first material, or may include the first material within thereof. Accordingly, when the first material is subjected to a change in its volume by an electrochemical reaction with lithium ions ($Li^+$) during the charge/discharge of a battery, the second material surrounding the first material may minimize the change in the volume of the first material.

A mixing ratio of the first material (a) and the second material (b) is adjusted in a weight ratio of a:b=10~90:90~10, preferably in a weight ratio of a:b=30~70:70~30 so as to more efficiently minimize or inhibit the change in the volume of the first material during the charge/discharge of a battery.

Also, it is appropriate that the first material and the second material have a particle size (average particle diameter) of about 0.1 nm to 10 μm. Furthermore, as the first material has a smaller particle size (average particle diameter), a change in an absolute volume of the first material during the charge/discharge is small, which can more efficiently inhibit the volume change of the entire composite.

The composite according to the present invention includes not only the first material and the second material, but also a third material, which is at least one kind of metal having a higher electrical conductivity than the second material, so as to improve the electrical conductivity of the composite.

For example, most metal-containing oxides are known as nonconductors, and to have low electrical conductivities. Moreover, besides the metal-containing oxides, an intermetallic compound, such as $CoSi_2$, has a high energy band gap, and thereby has a low electrical conductivity because in the intermetallic compound, it is difficult to transit (excite) electrons due to the electrons's strong binding to a nucleus. Accordingly, the composite according to the present invention, which includes the third material having a higher electrical conductivity than the second material, allows lithium ions ($Li^+$) and electrons to be wholly uniformly moved within the composite during the charge/discharge of a battery.

However, the third material is preferably distributed within the composite so that a side reaction with an electrolyte does not occur. Also, preferably, as shown in FIG. 1, the third material (3) is uniformly distributed within the composite so that lithium ions ($Li^+$) and electrons can smoothly move to the first material via the third material forming an electrical conducting path throughout the entire electrode active material, resulting in a uniform electrochemical reaction. More preferably, the third material (3) is uniformly distributed between the first materials (1), between the second materials (2), between the first material and the second material, or between all of these.

The third material exists in the forms of composites with the first material and the second material without a change in their chemical formulas. In other words, the third material may be distributed within the composite, as a single-element material, by being mixed with the first material and the second material without a chemical bond with the first material and the second material.

Examples of the third material may include metals selected from groups 1 to 12 of the Periodic Table, such as metals as noted in Table 1, and may preferably include transition metals. More preferably, examples of the third material may include metals, such as iron (Fe), nickel (Ni), cobalt (Co), or the like, which are incapable of being alloyed with lithium, and have a low ductility. These metals may be more uniformly distributed within the composite.

TABLE 1

| Third material | Electrical conductivity (/cmΩ) |
|---|---|
| Copper (Cu) | $0.596 \times 10^6$ |
| Gold (Au) | $0.452 \times 10^6$ |
| Beryllium (Be) | $0.313 \times 10^6$ |
| Calcium (Ca) | $0.298 \times 10^6$ |
| Magnesium (Mg) | $0.226 \times 10^6$ |
| Rhodium (Rh) | $0.211 \times 10^6$ |
| Sodium (Na) | $0.21 \times 10^6$ |
| Iridium (Ir) | $0.197 \times 10^6$ |
| Tungsten (W) | $0.189 \times 10^6$ |
| Molybdenum (Mo) | $0.187 \times 10^6$ |
| Cobalt (Co) | $0.172 \times 10^6$ |
| Zinc (Zn) | $0.166 \times 10^6$ |
| Nickel (Ni) | $0.143 \times 10^6$ |
| Potassium (K) | $0.139 \times 10^6$ |
| Cadmium (Cd) | $0.138 \times 10^6$ |
| Ruthenium (Ru) | $0.137 \times 10^6$ |
| Indium (In) | $0.116 \times 10^6$ |
| Osmium (Os) | $0.109 \times 10^6$ |
| Lithium (Li) | $0.108 \times 10^6$ |
| Iron (Fe) | $0.0993 \times 10^6$ |

It is appropriate that the particle size (average particle diameter) of the third material is in a range of about 0.1 to 1000 nm, preferably of 10 to 1000 nm so as to form a more effective electrical conducting path and minimize (or inhibit) the volume expansion of the first material.

There is no limitation in a method that may be used to prepare the composite according to the present invention as long as through the method, the third material can be uniformly distributed within a final composite. Non-limiting examples of such a preparation method include a mechanical alloying method, a heat-treating method, or the like.

As one example of preparing the composite according to the present invention, the composite may be prepared by the steps of: i) firstly mixing a metal or a metalloid capable of being reversibly alloyed with lithium, with at least one selected from the group consisting of compounds containing the metal or the metalloid, metals incapable of being alloyed with lithium, compounds containing the metals and precursors thereof; ii) preparing the resultant first mixture into a feed material including the first material and the second material through a method of generally preparing a composite with a uniform composition (such as mechanical alloying), or a general alloying method known in the art (such as melting/rapid-cooling); iii) secondly mixing the feed material with at least one kind of third material having a higher electrical conductivity than the second material in the feed material; and iv) carrying out a mechanical alloying process on the resultant second mixture in a mechano-fusion apparatus. Herein, the mechanical alloying process indicates the preparation of a composite with a uniform composition through application of a mechanical force.

As another example of preparing the composite according to the present invention, the composite may be prepared by the steps of: secondly mixing the feed material including the first material and the second material, with the third material, that is, at least one kind of metal having a higher electrical conductivity than the second material; and carrying out heat-treatment on the resultant second mixture.

1) Examples of a metal or a metalloid capable of being reversibly alloyed with lithium, which may be used in the present invention, are the same as those of the above-mentioned first material, and specifically include Si, Al, Sn, Sb, Bi, As, Ge, Pb, and the like.

Examples of a material that may be mixed with the metal or the metalloid include the above mentioned second material, and a precursor thereof, such as silicon dioxide ($SiO_2$), cobalt (Co), nickel (Ni), MgO, SiCo, $Si_2Co$, $SiCO_2$, SiNi, $Si_2Ni$, CaO, $Li_2O$, and precursors thereof, but the present invention is not limited thereto.

In the prepared feed material, both the first material and the second material exist. For example, a mixture of silicon (Si) and silicon dioxide ($SiO_2$) may be subjected to mechanical alloying through ball milling to provide silicon monoxide (SiO) including silicon and silicon dioxide. Also, a mixture of silicon (Si) and cobalt (Co) may be melt-spinned, and rapidly solidified to form an alloy of Si—Co. Herein, the Si—Co alloy may include Si, and at least one selected from the group consisting of Co, SiCo, $Si_2Co$, $SiCO_2$, and the like, according to alloying conditions, such as a relative amount of Si, and a cooling condition.

The feed material prepared as described above is mixed with the third material, that is, at least one kind of metal having a higher electrical conductivity than the second material in the feed material. Herein, the feed material (a) and the third material (b) are preferably mixed with each other in a weight ratio of a:b=99.999~99:0.001~1 in such a manner that the third material can be contained in a final composite in an amount of about 10~10,000 ppm based on the total weight of the composite. More preferably, the feed material (a) and the third material (b) are mixed with each other in a weight ratio of a:b=99.999~99.5:0.001~0.5 in such a manner that the third material can be contained in a final composite in an amount of about 10~5,000 ppm based on the total weight of the composite.

Examples of the third material may include metals selected from groups 1 to 12 of the Periodic Table, preferably include transition metals, and more preferably include metals, such as Fe, Co, Ni, or the like, which are incapable of being alloyed with lithium, and have a low ductility.

Also, there is no limitation in the particle size (average particle diameter) and the type of the feed material. The feed material has a particle size within a range of about 0.001 to 1000 μm, preferably within a range of about 0.01 to 500 μm, and takes a powder type so that the first material, the second material, and the third material can be uniformly distributed within the composite.

Also, there is no limitation in the particle size (average particle diameter) and the type of the third material. The third material has a particle size within a range of about 0.001 to 1000 μm, preferably within a range of about 10 to 1000 μm, and takes a powder type so that the first material, the second material, and the third material can be uniformly distributed within the composite.

2) Then, the mixture of the feed material with the third material may be subjected to mechanical alloying so as to provide a composite, by a mechano-fusion apparatus, but the present invention is not limited thereto.

Non-limiting examples of the mechano-fusion apparatus may include a high energy ball mill, a planetary mill, a stirred ball mill, a vibrating mill, and the like.

Herein, when the mechanical alloying is carried out by adjusting the rotation speed and the rotation time of the mechano-fusion apparatus, the use ratio of balls and the mixture, and the size of the balls, a compressive stress and a shear stress, applied on the mixture of the feed material with the third material, are adjusted. Thus, the mixture can be more uniformly mixed while being ground, and at the same time, the extent of the diffusion and dispersion of the third material into the feed material can be adjusted. This makes it possible to form a composite including the third material uniformly distributed therein.

For this, it is appropriate that the rotation speed of the mechano-fusion apparatus is within a range of about 300 to 3000 rpm, preferably within a range of 1000 to 3000 rpm, and the rotation time is within a range of about 5 minutes to 10 hours, preferably within a range of 30 minutes to 10 hours. Also, it is appropriate that the balls and the mixture are included in a weight ratio of balls: mixture=50~98:50~2, preferably of 50~90:50~10 in such a manner that an appropriate compressive stress can be transferred to the mixture without a reduction in the produced amount of the composite.

The ball may be a stainless steel ball or a zirconia ball, with a diameter in a range of 0.1 to 10 mm.

Besides the above described mechanical alloying, the mixture of the feed material with the third material may be heat-treated so as to provide a composite. Herein, in order to uniformly distribute the third material within a final composite, the temperature and the time of the heat-treatment may be adjusted in such a manner that the third material can be uniformly diffused and dispersed into the feed material, preferably between the first material(s) and/or the second material(s) of the feed material. The heat-treatment temperature may be a temperature where the third material does not chemically react with the first material and the second material within the feed material, for example, within a range of about 300 to 1500° C. Also, the heat-treatment time may be within a range of about 30 minutes to 20 hours.

2. Electrode Active Material Including Composite, and Preparation Method of the Same The composite according to the present invention, prepared by the above described method, may be used as an electrode active material for a secondary battery, especially as an anode active material. Herein, the composite may be used alone, or may be used in combination with a material capable of electrochemically reacting with lithium, preferably with a material capable of electrochemically reacting with lithium and providing conductivity to the surface of the composite. Also, the composite may be used as a core of an electrode active material having a core-shell structure.

For example, the electrode active material employing the composite according to the present invention may include: a matrix including a carbonaceous material; and the composite dispersed within the matrix (not shown). In such an electrode active material, the electrical contact between composites can be improved due to the distribution of the carbonaceous material matrix between the composites.

The electrode active material may be prepared by mixing the composite with a carbonaceous material in a weight ratio of 50~99.5:50~0.5, or mixing a precursor of the carbonaceous material with the composite in a weight ratio of 50~99.5:50~0.5, and then heat-treating the resultant mixture at a temperature within a range of about 500 to 2000° C., for about 1 to 100 hours, but the present invention is not limited thereto.

Non-limiting examples of the carbonaceous material may include a linear conductive carbon material (such as carbon-tube, carbon-fiber), and a point conductive carbon material (such as Super-P, Acetylene black). Non-limiting examples of the precursor of the carbonaceous material may include coal tar pitch, petroleum pitch, various kinds of organic materials, carbon-containing gas, and the like.

Figure 2:
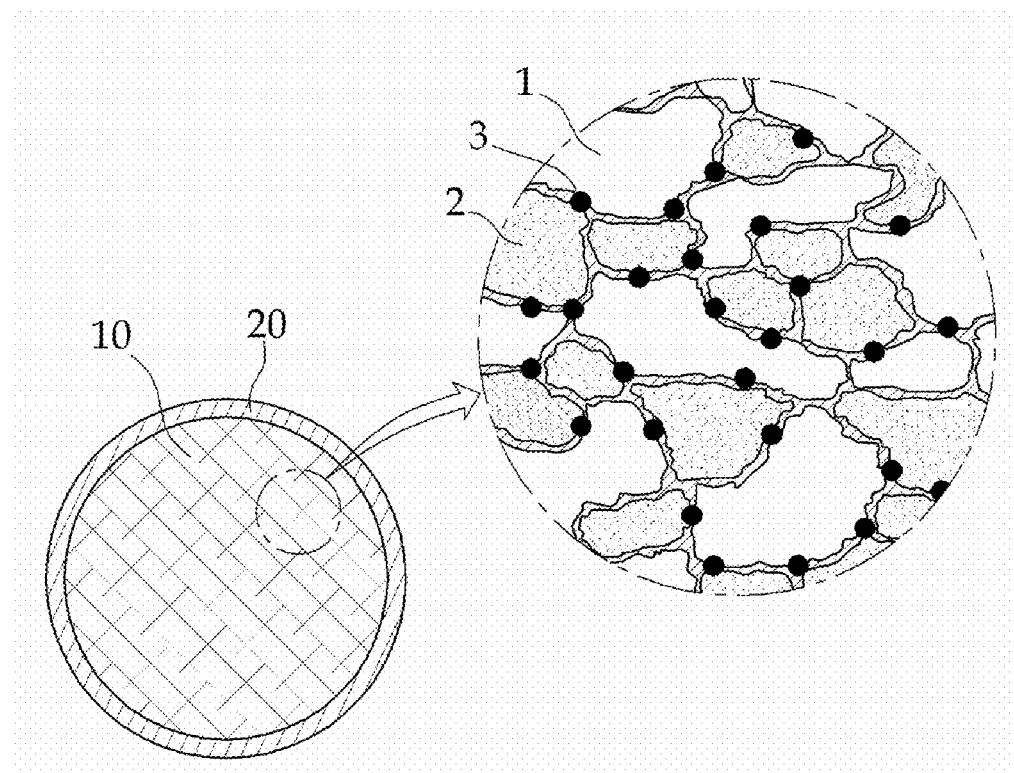
FIG. 2 is a view showing an example of an electrode active material comprising a composite according to the present invention.
Figure 3:
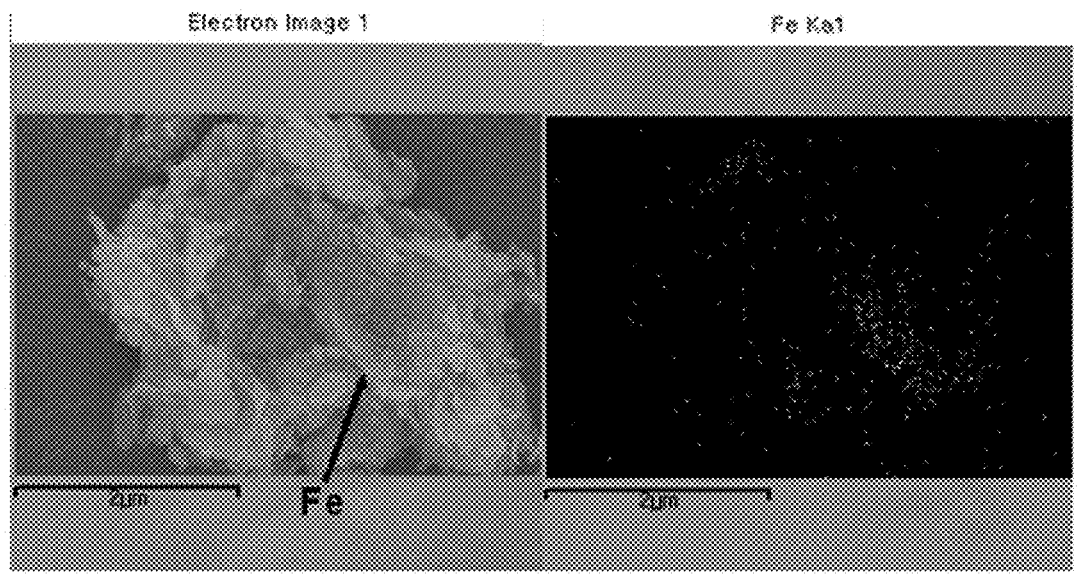
FIG. 3 shows photographs of a composite prepared from Example 10, in which the left one is a scanning electron microscope (SEM) photograph, and the right one is an energy dispersive X-ray (EDX) photograph.

Also, the electrode active material employing the composite according to the present invention may include: a core 10 including the composite; and a carbon layer 20 formed partly or entirely on the surface of the core, as shown in FIG. 2. Herein, the carbon layer may be a crystalline carbon layer, an amorphous carbon layer, or both of them. If the carbon layer includes both of the crystalline carbon layer and the amorphous carbon layer, the crystalline carbon layer and the amorphous carbon layer may be sequentially layered on the surface of the core.

Examples of the carbonaceous material forming the carbon layer may include natural graphite having a high graphitization degree, artificial graphite, and the like. Examples of the graphite-based material may include MCMB (MesoCarbon MicroBead), carbon fiber, natural graphite, and the like. In addition to the mentioned crystalline carbons, examples of the carbonaceous material may include amorphous carbons, such as coal tar pitch, petroleum pitch, various kinds of organic materials, and carbon-containing gas, and most of these materials have an amorphous structure through heat-treatment or pyrolysis.

However, the crystalline carbon does not merely form a crystalline carbon layer, and the amorphous carbon does not merely form an amorphous carbon layer. For example, when the graphite having a high graphitization degree is subjected to a mechanical alloying process, together with a composite as a core, to prepare an electrode active material, a carbon layer with a low crystallinity or an amorphous carbon layer may be formed in interface between the composite and the graphite. Also, when the amorphous carbon is subjected to a heat-treatment process, together with a composite as a core, a part or all of the amorphous carbon may be converted into crystalline carbon, thereby forming a crystalline carbon layer.

In the present invention, there is no limitation in the amounts of the core and the carbon layer. However, it is appropriate that the amounts of the core and the carbon layer are adjusted in a ratio of core: carbon layer=98~10 parts by weight: 2~90 parts by weight in such a manner that the electrode active material can have higher capacity, and the surface of the core (that is, the surface of the composite) can be applied with more sufficient electrical conductivity.

The electrode active material having the core-shell structure may be prepared by the first step of mixing the composite with a carbonaceous material; and the second step of performing a mechanical alloying process on the mixture in a mechano-fusion apparatus, but the present invention is not limited thereto.

First, the composite according to the present invention, including the first material, the second material, and the third material, is mixed with a carbonaceous material. Herein, there is no limitation in the mixing ratio of the composite and the carbonaceous material. However, it is appropriate that the composite (a) and the carbonaceous material (b) are mixed with each other in a weight ratio of a:b=98~10 parts by weight: 2~98 parts by weight, preferably of 98~30:2~70 in such a manner that the electrode active material can have a higher capacity, and the surface of the core (that is, the surface of the composite) can be applied with more sufficient electrical conductivity.

Then, the mixture of the composite and the carbonaceous material is subjected to mechanical alloying in a mechano-fusion apparatus.

The mechano-fusion apparatus is the same as that used in preparing the above described composite.

However, unlike the above described composite, a final electrode active material having the core-shell structure is required to have a carbon layer including a carbonaceous material, formed on the surface of a composite as a core. Thus, it is appropriate to adjust mechanical alloying conditions of the core-shell structure electrode active material (such as the rotation speed and the rotation time of the mechano-fusion apparatus, the use ratio of balls and the mixture, and the size of the balls) differently from those of the composite.

For this, it is appropriate that the rotation speed of the mechano-fusion apparatus ranges from about 100 to 3000 rpm, and the rotation time ranges from about 5 to 120 minutes. Also, it is appropriate that the balls and the mixture are included in a weight ratio of balls: mixture=5~30:1 in such a manner that an appropriate compressive stress can be transferred to the mixture without a reduction in the produced amount of the composite. Also, the ball may be a stainless steel ball or a zirconia ball, with a diameter in a range of 0.1 to 10 mm.

The electrode active material having the core-shell structure may be prepared by not only the above mentioned mechanical alloying process, but also a chemical vapour deposition (CVD) method for depositing a carbonaceous material-containing gas on the surface of a heated composite.

3. Electrode Including the Composite, and a Secondary Battery

The electrode according to the present invention may be manufactured by a conventional method known in the art. For example, a slurry is prepared by mixing and agitating the composite according to the present invention (as an electrode active material), a binder, and a solvent, optionally with a conductive agent and a dispersant, and then the slurry is applied onto a metallic current collector, followed by compressing and drying. Otherwise, instead of the composite, the electrode active material having a core-shell structure, which is prepared by using the composite as a core, may be used.

Herein, the binder may be included in a range of about 1 to 10 parts by weight, based on 100 parts by weight of the electrode active material, and the conductive agent may be included in a range of about 1 to 30 parts by weight, based on 100 parts by weight of the electrode active material.

Non-limiting examples of the binder that may be used in the present invention may include polytetrafluoroethylene (PTFE), polyvinylidene fluoride (PVdF), polyvinylacetate, polyethyleneoxide, polypyrrolidone, polyvinylalcohol, polyacrylonitrile (PAN), polyacrylic acid (PAA), and the like. Besides, the example may include a water-based binder, such as carboxymethylcellulose (CMC), styrene-butadiene rubber (SBR), CMC/SBR system.

Non-limiting examples of the conductive agent may include carbon black, and currently commercially available conductive materials, such as acetylene black-based materials (commercially available from Chevron Chemical Company or Gulf Oil Company), Ketjen Black EC-based materials (commercially available from Armak Company), Vulcan XC-72 (commercially available from Cabot Company) and super P (commercially available from MMM), and the like. Also, the examples include fiber or tube type conductive materials, such as Vapor grown carbon fiber-based (VGCF) materials, carbon nano tube (CNT)-based materials. Such a conductive material may provide conductivity between electrode active materials, and also minimize a problem of non-contact between electrode active materials which may be caused by a change in a volume of the first material within an electrode active material during the charge/discharge of a battery.

The metallic current collector includes a metal with high conductivity. As the metallic current collector, any metal to which the electrode active material slurry can be adhered with ease can be used as long as it shows no reactivity in the drive voltage range of a battery using the same. Non-limiting examples of the cathode current collector may include a mesh, a foil, etc. made of copper, gold, nickel, or a combination thereof. The representative examples of the anode current collector may include a foil made of copper, gold, nickel, copper alloy, or a combination thereof.

There is no limitation in a method for applying the slurry to the current collector. For example, the slurry may be applied by using various methods, such as doctor blade, dipping, brushing, or the like. Also, there is no limitation in the application amount of the slurry, but preferably, the amount allows the thickness of the electrode active material's layer formed after the removal of a solvent or a dispersant to be in a range of about 0.005 to 5 mm, preferably of about 0.05 to 2 mm.

There is no limitation in a method of removing a solvent or a dispersant. However, it is preferred to use the method that the solvent or dispersant is controlled to be volatilized as quickly as possible and removed within the range of the speed which does not cause cracks on the layer of the active material, or separation of the active material layer from the current collector due to the generation of stress concentration. For example, the solvent or the dispersant may be removed through a drying process within a vacuum drier having a temperature of about 50 to 200° C. for 0.5 to 3 days, or through a drying process within a drier having a temperature of less than about 200° C. in the air, and then another drying process of a final electrode within a vacuum drier having a temperature of about 200° C.

The composite according to the present invention can be used for every electrochemically reacting device. For example, the electrochemically reacting device includes all kinds of primary batteries, secondary batteries, fuel batteries, solar batteries, and capacitors, in which the secondary batteries are preferable.

The secondary battery according to the present invention may be manufactured by employing the electrode obtained by using the composite of the present invention, through a conventional method known in the art. For example, the secondary battery may be manufactured by inserting a porous separator between a cathode and an anode, and injecting an electrolyte. Also, examples of the secondary battery may include a lithium ion secondary battery, a lithium polymer secondary battery, or a lithium ion polymer secondary battery.

The electrolyte may include a non-aqueous solvent and an electrolyte salt.

There is no limitation in the non-aqueous solvent as long as it is generally used as a non-aqueous solvent for a non-aqueous electrolyte. Examples of the non-aqueous solvent may include cyclic carbonates, linear carbonates, lactones, ethers, esters, ketones, and the like.

Examples of the cyclic carbonates include ethylene carbonate (EC), propylene carbonate (PC), butylene carbonate (BC), or the like. Examples of the linear carbonates include diethyl carbonate (DEC), dimethyl carbonate (DMC), dipropyl carbonate (DPC), ethylmethyl carbonate (EMC), methyl propyl carbonate (MPC), or the like. Examples of the lactone include gamma-butyrolactone (GBL). Examples of the ether include dibutyl ether, tetrahydrofuran, 2-methyltetrahydrofuran, 1,4-dioxane, 1,2-dimethoxyethane, or the like. Examples of the ester include n-methylacetate, n-ethylacetate, methyl propionate, methyl pivalate, or the like. Examples of the ketone may include polymethylvinyl ketone. Also, such non-aqueous solvents may be used alone or in the form of a mixture of two or more thereof.

There is no particular limitation in the electrolyte salt, as long as the electrolyte salt is generally used for a non-aqueous electrolyte. Non-limiting examples of an electrolyte salt include salts having a structure such as $A^+B^-$, wherein $A^+$ contains an ion selected from among alkaline metal cations, such as $Li^+$, $Na^+$ and $K^+$, combinations thereof, and $B^-$ contains an ion selected from among anions, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, and combinations thereof. Particularly, a lithium salt is preferred. The electrolyte salts may be used alone or in the form of a mixture of two or more thereof.

The secondary battery of the present invention may include a separator. A separator which can be used in the present invention is not limited, but a porous separator is preferred. Non-limiting examples thereof include porous polypropylene, polyethylene or polyolefin separators.

There is no particular limitation in the outer shape of the secondary battery according to the present invention. The secondary battery may be a cylindrical battery using a can, a prismatic battery, a pouch-type battery, or a coin-type battery.

Hereinafter, the present invention will be described in more detail with reference to Examples and Comparative Examples. However, the following Examples are intended to be exemplary only and are not intended to limit the scope of the present invention.

EXAMPLE 1

1-1. Preparation of a Composite

SiO powder and Fe powder were mixed with each other in a weight ratio of 99.5:0.5. The mixture was ball-milled with a stainless steel ball in a ball mill apparatus under the operating conditions as described below to provide a composite. Herein, through the ICP (Inductively Coupled Plasma Spectrometer) (Perkin Elmer, Optima 5300DV) analysis of the prepared composite, it was found that the composite contains Fe in an amount of 5,000 ppm.

<Operating Conditions of a Ball Mill Apparatus>

Rotation speed—1000 rpm

Rotation time—30 minutes

Use amount of ball and mixture—15:1 in a weight ratio

Diameter of a ball—5 mm 1-2. Manufacture of an Electrode and a Secondary Battery The composite obtained from Example 1-1, as an electrode active material, polyvinylidenefluoride (PVdF) as a binder, and acetylene black as a conductive agent were mixed with each other in a weight ratio of 93:2:5. The mixture was added to N-methyl-2-pyrrolidone (NMP) as a solvent to provide a uniform slurry. The prepared slurry was coated onto one surface of a copper (Cu) current collector with a thickness of about 60 μm, and then was subjected to a drying process and roll-press, and was punched with a size of 1.4875 cm² to provide an electrode.

Ethylene carbonate (EC) and diethylene carbonate (DEC) were mixed with each other in a weight ratio of 30:70, and 1M $LiPF_6$ was added thereto to provide a non-aqueous electrolyte.

Between the electrode and lithium metal as a counter electrode, a polyolefin separator was intervened, and the prepared non-aqueous electrolyte was injected thereto, to manufacture a secondary battery.

EXAMPLE 2

A composite, an electrode including the composite, and a secondary battery, were manufactured in the same manner as described in Example 1, except that SiO powder and Fe powder were mixed with each other in a weight ratio of 99.998:0.002, instead of 99.5:0.5. Herein, through the ICP analysis of the prepared composite, it was found that the composite contains Fe in an amount of about 20 ppm.

EXAMPLE 3

A composite, an electrode including the composite, and a secondary battery were manufactured in the same manner as described in Example 1, except that SiO powder and Fe powder were mixed with each other in a weight ratio of 99.05:0.95, instead of 99.5:0.5. Herein, through the ICP analysis of the prepared composite, it was found that the composite contains Fe in an amount of about 9,500 ppm.

EXAMPLE 4

4-1. Preparation of a Composite

Silicon (Si) powder and cobalt (Co) powder were mixed with each other in a weight ratio of 60:40, and the resultant mixture was taken in a melt spinning apparatus. Then, the mixture was melted at about 1600° C., and was flown out through a nozzle to drop to the lateral side of a circular wheel rotating at a rate of about 2000 rpm. Next, the resultant mixture was rapidly solidified to provide an Si—Co alloy, and the alloy was ground to provide Si—Co alloy powder (including Si and $Si_2Co$).

The Si—Co alloy powder was mixed with Fe powder in a weight ratio of 99.5:0.5. The mixture was ball-milled with a stainless steel ball in a ball mill apparatus under the same operating conditions as those described in Example 1 to provide a composite. Herein, through the ICP analysis of the prepared composite, it was found that the composite contains Fe in an amount of about 5,000 ppm.

4-2. Manufacture of an Electrode and a Secondary Battery

The composite obtained from Example 4-1, as an electrode active material, polyvinylidenefluoride (PVdF) as a binder, and acetylene black as a conductive agent were mixed with each other in a weight ratio of 93:2:5. The mixture was added to N-methyl-2-pyrrolidone (NMP) as a solvent to provide a uniform slurry. The prepared slurry was coated onto one surface of a copper (Cu) current collector with a thickness of about 60 μm, and then was subjected to a drying process and roll-press, and was punched with a size of 1.4875 cm² to provide an electrode.

Ethylene carbonate (EC) and diethylene carbonate (DEC) were mixed with each other in a weight ratio of 30:70, and 1M $LiPF_6$ was added thereto to provide a non-aqueous electrolyte.

Between the electrode and lithium metal as a counter electrode, a polyolefin separator was intervened, and the prepared non-aqueous electrolyte was injected thereto, to manufacture a secondary battery.

EXAMPLE 5

A composite, an electrode including the composite, and a secondary battery, were manufactured in the same manner as described in Example 4, except that Si—Co alloy powder and Fe powder were mixed with each other in a weight ratio of 99.998:0.002, instead of 99.5:0.5. Herein, through the ICP analysis of the prepared composite, it was found that the composite contains Fe in an amount of about 20 ppm.

EXAMPLE 6

A composite, an electrode including the composite, and a secondary battery, were manufactured in the same manner as described in Example 4, except that Si—Co alloy powder and Fe powder were mixed with each other in a weight ratio of 99.05:0.95, instead of 99.5:0.5. Herein, through the ICP analysis of the prepared composite, it was found that the composite contains Fe in an amount of about 9,500 ppm.

EXAMPLE 7

A composite, an electrode including the composite, and a secondary battery, were manufactured in the same manner as described in Example 1, except that SiO powder and Co powder were mixed with each other in a weight ratio of 99.5:0.5 instead of SiO powder and Fe powder being mixed with each other in a weight ratio of 99.5:0.5. Herein, through the ICP analysis of the prepared composite, it was found that the composite contains cobalt (Co) in an amount of about 5,000 ppm.

EXAMPLE 8

A composite, an electrode including the composite, and a secondary battery, were manufactured in the same manner as described in Example 4, except that Si—Co alloy powder and Co powder were mixed with each other in a weight ratio of 99.5:0.5, instead of Si—Co alloy powder and Fe powder being mixed with each other in a weight ratio of 99.5:0.5. Herein, through the ICP analysis of the prepared composite, it was found that the composite contains cobalt (Co) in an amount of about 5,000 ppm.

EXAMPLE 9

A composite, an electrode including the composite, and a secondary battery, were manufactured in the same manner as described in Example 1, except that SiO powder, Fe powder, and Co powder were mixed with each other in a weight ratio of 99.5:0.25:0.25 instead of SiO powder and Fe powder being mixed with each other in a weight ratio of 99.5:0.5. Herein, through the ICP analysis of the prepared composite, it was found that the composite contains Fe in an amount of about 2,500 ppm, and cobalt (Co) in an amount of 2,500 ppm.

COMPARATIVE EXAMPLE 1

An electrode and a secondary battery were manufactured in the same manner as described in Example 1, except that SiO powder was used as an electrode active material instead of the composite obtained from Example 1-1 [composite containing SiO and Fe (5000 ppm)].

COMPARATIVE EXAMPLE 2

A composite was prepared in the same manner as described in Example 1, except that SiO powder and Fe powder were mixed with each other in a weight ratio of 99.9996:0.0004, instead of 99.5:0.5. Then, an electrode using the composite, and a secondary battery were manufactured. Herein, through the ICP analysis of the prepared composite, it was found that the composite contains Fe in an amount of about 4 ppm.

COMPARATIVE EXAMPLE 3

A composite was prepared in the same manner as described in Example 1, except that SiO powder and Fe powder were mixed with each other in a weight ratio of 98.9:1.1, instead of 99.5:0.5. Then, an electrode using the composite, and a secondary battery were manufactured. Herein, through the ICP analysis of the prepared composite, it was found that the composite contains Fe in an amount of about 11,000 ppm.

COMPARATIVE EXAMPLE 4

A composite was prepared in the same manner as described in Example 1, except that SiO powder and Fe powder were mixed with each other in a Weight ratio of 98:2, instead of 99.5:0.5. Then, an electrode using the composite, and a secondary battery were manufactured. Herein, through the ICP analysis of the prepared composite, it was found that the composite contains Fe in an amount of about 20,000 ppm.

COMPARATIVE EXAMPLE 5

An electrode and a secondary battery were manufactured in the same manner as described in Example 1, except that Si—Co alloy powder obtained from Example 2-1 was used as an electrode active material instead of the composite obtained from Example 1-1 [composite containing SiO and Fe (5000 ppm)].

COMPARATIVE EXAMPLE 6

A composite was prepared in the same manner as described in Example 4, except that Si—Co alloy powder and Fe powder were mixed with each other in a weight ratio of 99.9996:0.0004, instead of 99.5:0.5. Then, an electrode using the composite, and a secondary battery were manufactured. Herein, through the ICP analysis of the prepared composite, it was found that the composite contains Fe in an amount of about 4 ppm.

COMPARATIVE EXAMPLE 7

A composite, an electrode including the composite, and a secondary battery, were manufactured in the same manner as described in Example 4, except that Si—Co alloy powder and Fe powder were mixed with each other in a weight ratio of 98.9:1.1, instead of 99.5:0.5. Herein, through the ICP analysis of the prepared composite, it was found that the composite contains iron (Fe) in an amount of about 11,000 ppm.

COMPARATIVE EXAMPLE 8

A composite was prepared in the same manner as described in Example 4, except that Si—Co alloy powder and Fe powder were mixed with each other in a weight ratio of 98:2, instead of 99.5:0.5. Then, an electrode using the composite, and a secondary battery were manufactured. Herein, through the ICP analysis of the prepared composite, it was found that the composite contains Fe in an amount of about 20,000 ppm.

COMPARATIVE EXAMPLE 9

A composite, an electrode, and a secondary battery were manufactured in the same manner as described in Example 1, except that SiO powder, and Co powder were mixed with each other in a weight ratio of 98:2 instead of SiO powder and Fe powder being mixed with each other in a weight ratio of 99.5:0.5. Herein, through the ICP analysis of the prepared composite, it was found that the composite contains cobalt (Co) in an amount of about 20,000 ppm.

COMPARATIVE EXAMPLE 10

A composite, an electrode employing the composite, and a secondary battery were manufactured in the same manner as described in Example 4, except that Si—Co alloy powder and Co powder were mixed with each other in a weight ratio of 98:2, instead of Si—Co alloy powder and Fe powder being mixed with each other in a weight ratio of 99.5:0.5. Herein, through the ICP analysis of the prepared composite, it was found that the composite contains cobalt (Co) in an amount of about 20,000 ppm.

EXAMPLE 10

10-1. Preparation of an Electrode Active Material Including a Composite

The composite obtained from Example 1-1 was mixed with natural graphite in a ratio of 80 parts by weight:20 parts by weight. The resultant mixture was ball-milled with a stainless steel ball in a ball mill apparatus under the operating conditions as described below to provide an electrode active material.

<Operating Conditions of a Ball Mill Apparatus>
Rotation speed—about 1,000 rpm
Rotation time—about 10 minutes
Use amount of ball and mixture—15:1 in a weight ratio
Diameter of a ball—about 5 mm 10-2. Manufacture of an Electrode and a Secondary Battery The electrode active material obtained from Example 10-1, polyvinylidenefluoride (PVdF) as a binder, and acetylene black as a conductive agent were mixed with each other in a weight ratio of 93:2:5. The mixture was added to N-methyl-2-pyrrolidone (NMP) as a solvent to provide a uniform slurry. The prepared slurry was coated onto one surface of a copper (Cu) current collector with a thickness of about 80 μm, and then was subjected to a drying process and roll-press, and was punched with a size of 1.4875 cm$^2$ to provide an electrode.

Ethylene carbonate (EC) and diethylene carbonate (DEC) were mixed with each other in a weight ratio of 30:70, and 1M LiPF$_6$ was added thereto to provide a non-aqueous electrolyte.

Between the electrode and lithium metal as a counter electrode, a polyolefin separator was intervened, and the prepared non-aqueous electrolyte was injected thereto, to manufacture a secondary battery.

EXAMPLE 11

An electrode active material, an electrode, and a secondary battery were manufactured in the same manner as described in Example 10, except that the composite obtained from Example 2, instead of the composite obtained from Example 1-1, was used.

EXAMPLE 12

An electrode active material, an electrode, and a secondary battery were manufactured in the same manner as described in Example 10, except that the composite obtained from Example 3, instead of the composite obtained from Example 1-1, was used.

EXAMPLE 13

An electrode active material, an electrode, and a secondary battery were manufactured in the same manner as described in Example 10, except that the composite obtained from Example 4-1, instead of the composite obtained from Example 1-1, was used.

EXAMPLE 14

An electrode active material, an electrode, and a secondary battery were manufactured in the same manner as described in Example 10, except that the composite obtained from Example 5, instead of the composite obtained from Example 1-1, was used.

EXAMPLE 15

An electrode active material, an electrode, and a secondary battery were manufactured in the same manner as described in Example 10, except that the composite obtained from Example 6, instead of the composite obtained from Example 1-1, was used.

EXAMPLE 16

16-1. Preparation of an Electrode Active Material Including a Composite

The composite obtained from Example 7 was mixed with natural graphite in a ratio of 80 parts by weight: 20 parts by weight. The resultant mixture was ball-milled with a stainless steel ball and 1 part by weight of stearic acid (as a process control agent) in a ball mill apparatus under the same operating conditions as those described in Example 6. Then, the ball-milled mixture was washed with water to remove any remaining stearic acid, followed by drying, to provide an electrode active material.

16-2. Manufacture of an Electrode and a Secondary Battery

The electrode active material obtained from Example 16-1, polyvinylidenefluoride (PVdF) as a binder, and acetylene black as a conductive agent were mixed with each other in a weight ratio of 93:2:5. The mixture was added to N-methyl-2-pyrrolidone (NMP) as a solvent to provide a uniform slurry. The prepared slurry was coated onto one surface of a copper (Cu) current collector with a thickness of about 80 μm, and then was subjected to a drying process and roll-press, and was punched with a size of 1.48750 cm$^2$ to provide an electrode.

Ethylene carbonate (EC) and diethylene carbonate (DEC) were mixed with each other in a weight ratio of 30:70, and 1M LiPF$_6$ was added thereto to provide a non-aqueous electrolyte.

Between the electrode and lithium metal as a counter electrode, a polyolefin separator was intervened, and the prepared non-aqueous electrolyte was injected thereto, to manufacture a secondary battery.

EXAMPLE 17

An electrode active material, an electrode, and a secondary battery were manufactured in the same manner as described in Example 16, except that the composite obtained from Example 8, instead of the composite obtained from Example 7, was used.

COMPARATIVE EXAMPLE 11

An electrode and a secondary battery were manufactured in the same manner as described in Example 10, except that SiO powder was used instead of the composite obtained from Example 1-1 [composite containing SiO and Fe (5000 ppm)].

COMPARATIVE EXAMPLE 12

An electrode active material, an electrode, and a secondary battery were manufactured in the same manner as described in Example 10, except that the composite [containing SiO and Fe (4 ppm)] obtained from Comparative Example 2 was used instead of the composite [containing SiO and Fe (5000 ppm)] obtained from Example 1-1.

COMPARATIVE EXAMPLE 13

An electrode active material, an electrode, and a secondary battery were manufactured in the same manner as described in Example 10, except that the composite [containing SiO and Fe (11,000 ppm)] obtained from Comparative Example 3 was used instead of the composite [containing SiO and Fe (5000 ppm)] obtained from Example 1-1.

COMPARATIVE EXAMPLE 14

An electrode active material, an electrode, and a secondary battery were manufactured in the same manner as described in Example 10, except that the composite [containing SiO and Fe (20,000 ppm)] obtained from Comparative Example 4 was used instead of the composite [containing SiO and Fe (5000 ppm)] obtained from Example 1-1.

COMPARATIVE EXAMPLE 15

An electrode active material, an electrode, and a secondary battery were manufactured in the same manner as described in Example 10, except that the Si—Co powder obtained from Example 4-1 was used instead of the composite [containing SiO and Fe (5000 ppm)] obtained from Example 1-1.

COMPARATIVE EXAMPLE 16

An electrode active material, an electrode, and a secondary battery were manufactured in the same manner as described in Example 10, except that the composite [containing Si—Co alloy and Fe (4 ppm)] obtained from Comparative Example 6 was used instead of the composite [containing SiO and Fe (5000 ppm)] obtained from Example 1-1.

COMPARATIVE EXAMPLE 17

An electrode active material, an electrode, and a secondary battery were manufactured in the same manner as described in Example 10, except that the composite [containing Si—Co alloy and Fe (11,000 ppm)] obtained from Comparative Example 7 was used instead of the composite [containing SiO and Fe (5000 ppm)] obtained from Example 1-1.

COMPARATIVE EXAMPLE 18

An electrode active material, an electrode, and a secondary battery were manufactured in the same manner as described in Example 10, except that the composite [containing Si—Co alloy and Fe (20,000 ppm)] obtained from Comparative Example 8 was used instead of the composite [containing SiO and Fe (5000 ppm)] obtained from Example 1-1.

COMPARATIVE EXAMPLE 19

An electrode active material, an electrode, and a secondary battery were manufactured in the same manner as described in Example 16, except that the composite [containing SiO and Co (20,000 ppm)] obtained from Comparative Example 9 was used instead of the composite [containing SiO and Co (5000 ppm)] obtained from Example

COMPARATIVE EXAMPLE 20

An electrode active material, an electrode, and a secondary battery were manufactured in the same manner as described in Example 16, except that the composite [containing Si—Co alloy and Co (20,000 ppm)] obtained from Comparative Example 10 was used instead of the composite [containing SiO and Co (5000 ppm)] obtained from Example 7.

EXPERIMENTAL EXAMPLE 1

Test on Battery Performance

The composites or the electrode active materials, the electrodes, and the secondary batteries, obtained from Examples 1 to 17, and Comparative Examples 1 to 20, were used to perform the following tests, and the results thereof are noted in Table 2.

1. Measurement on Fe content

The content of Fe within each of the composites obtained from Examples 1 to 17, and Comparative Examples to 20 was measured by using ICP-OES (Perkin Elmer, Optima 5300DV).

2. Measurement on Powder Resistance 2 g of each of the composites or the electrode active materials, obtained from Examples 1 to 17, and Comparative Examples 1 to 20, was formed into a pellet, and was subjected to a force of 16 kN. Then, the powder resistance was measured by a 4 probe method.

3. Measurement on Discharge Capacity

Each of the batteries was charged to 5 mV under a constant current (CC/CV) condition, and charged to a current of 0.005 C at 5 mV, and then was discharged to 1.0V under a CC condition. Then, the discharge capacity was measured.

4. Test on a Life Characteristic and a Change in a Thickness of an Electrode

Cycling was carried out at a discharge rate of 0.1 C during the first and second cycles, and was carried out at a discharge rate of 0.5 C from the third cycle or later cycles. Then, the test was completed at the charge of the 50$^{th}$ cycle. Herein, the life characteristic (%) is calculated by $$\frac{\text{discharge capacity at 49th cycle}}{\text{discharge capacity at 1st cycle}} \times 100,$$

and the change in a thickness of an electrode (%) is calculated by $$\frac{|\text{initial electrode thickness} - \text{electrode thickness at 50th cycle}|}{\text{initial electrode thickness}} \times 100.$$

TABLE 2

| | Content of Fe or Co (ppm) | Powder resistance (ohm·cm) | Discharge capacity (mAh/g) | Life characteristic (%) | Change in electrode thickness (%) |
|---|---|---|---|---|---|
| Exp. 1 | Fe: 5,000 | $3.75 \times 10^2$ | 1613 | 85.5 | 52 |
| Exp. 2 | Fe: 20 | $5.34 \times 10^3$ | 1615 | 81.2 | 65 |
| Exp. 3 | Fe: 9,500 | $4.98 \times 10^1$ | 1617 | 93.6 | 48 |
| Exp. 4 | Fe: 5,000 | $2.98 \times 10^2$ | 1031 | 83.6 | 72 |
| Exp. 5 | Fe: 20 | $5.87 \times 10^3$ | 1045 | 79.1 | 78 |
| Exp. 6 | Fe: 9,500 | $8.54 \times 10^1$ | 1028 | 88.4 | 69 |
| Exp. 7 | Co: 5,000 | $1.92 \times 10^2$ | 1620 | 86.2 | 50 |
| Exp. 8 | Co: 5,000 | $2.17 \times 10^2$ | 1030 | 85.1 | 77 |
| Exp. 9 | Fe: 2,500 Co: 2,500 | $2.53 \times 10^2$ | 1615 | 83.7 | 53 |
| Comp. Exp. 1 | 0 | $2.36 \times 10^9$ | 1352 | 67.2 | 93 |
| Comp. Exp. 2 | Fe: 4 | $6.02 \times 10^8$ | 1355 | 68 | 91 |
| Comp. Exp. 3 | Fe: 11,000 | $2.16 \times 10^1$ | 1350 | 53.3 | 175 |
| Comp. Exp. 4 | Fe: 20,000 | $4.38 \times 10^1$ | 1322 | 48.6 | 203 |
| Comp. Exp. 5 | 0 | $1.62 \times 10^8$ | 835 | 55.6 | 133 |
| Comp. Exp. 6 | Fe: 4 | $1.07 \times 10^8$ | 836 | 55.2 | 135 |
| Comp. Exp. 7 | Fe: 11,000 | $7.86 \times 10^1$ | 1029 | 61.8 | 217 |
| Comp. Exp. 8 | Fe: 20,000 | $3.74 \times 10^1$ | 828 | 47.9 | 261 |
| Comp. Exp. 9 | Co: 20,000 | $3.21 \times 10^1$ | 1334 | 52.8 | 220 |
| Comp. Exp. 10 | Co: 20,000 | $3.58 \times 10^1$ | 825 | 49.2 | 285 |
| Exp. 10 | Fe: 5,000 | $2.16 \times 10^{-2}$ | 1290 | 99.5 | 40 |
| Exp. 11 | Fe: 20 | $3.22 \times 10^{-2}$ | 1305 | 95.5 | 54 |
| Exp. 12 | Fe: 9,500 | $2.18 \times 10^{-2}$ | 1288 | 99.8 | 38 |
| Exp. 13 | Fe: 5,000 | $1.95 \times 10^{-2}$ | 824 | 99.2 | 66 |
| Exp. 14 | Fe: 20 | $2.16 \times 10^{-2}$ | 826 | 94.5 | 74 |
| Exp. 15 | Fe: 9,500 | $1.83 \times 10^{-2}$ | 820 | 99.5 | 62 |
| Exp. 16 | Co: 5,000 | $1.88 \times 10^{-2}$ | 1288 | 99.4 | 42 |
| Exp. 17 | Co: 5,000 | $2.21 \times 10^{-2}$ | 819 | 98.9 | 68 |
| Comp. Exp. 11 | 0 | $3.89 \times 10^{-2}$ | 1330 | 88.3 | 76 |
| Comp. Exp. 12 | Fe: 4 | $4.01 \times 10^{-2}$ | 1300 | 87.9 | 76 |
| Comp. Exp. 13 | Fe: 11,000 | $2.04 \times 10^{-2}$ | 1289 | 67.2 | 152 |
| Comp. Exp. 14 | Fe: 20,000 | $1.88 \times 10^{-2}$ | 1270 | 53.3 | 174 |
| Comp. Exp. 15 | 0 | $2.26 \times 10^{-2}$ | 830 | 85 | 97 |
| Comp. Exp. 16 | Fe: 4 | $2.15 \times 10^{-2}$ | 825 | 86.2 | 96 |
| Comp. Exp. 17 | Fe: 11,000 | $1.61 \times 10^{-2}$ | 816 | 65.6 | 189 |
| Comp. Exp. 18 | Fe: 20,000 | $1.43 \times 10^{-2}$ | 814 | 58.4 | 239 |
| Comp. Exp. 19 | Co: 20,000 | $1.55 \times 10^{-2}$ | 1252 | 51.5 | 195 |
| Comp. Exp. 20 | Co: 20,000 | $1.43 \times 10^{-2}$ | 811 | 56.4 | 255 |

1) As noted in Table 2, the electric conductivity was improved as the content of iron (Fe) within a composite increases (Comparative Example 1>Comparative Example 2>Example 2>Example 1>Example 3>Comparative Example 3>Comparative Example 4; Comparative Example 5>Comparative Example 6>Example 5>Example 4>Example 6>Comparative Example 7>Comparative Example 8). However, the discharge capacity, the life characteristic, and the change in the electrode thickness did not show such a tendency.

Specifically, each of the secondary batteries containing Fe in an amount of about 10 to 10,000 ppm, obtained from Examples 1 to 3, showed a higher discharge capacity, compared to each of the secondary batteries containing Fe in an amount greater or less than the above mentioned range, obtained from Comparative Examples 1 to 4, and further showed a significantly improved life characteristic. Also, each of the secondary batteries obtained from Examples 4 to 6 showed a higher discharge capacity and an improved life characteristic, compared to each of the secondary batteries obtained from Comparative Examples 5 to 8.

Meanwhile, each of the anodes obtained from Examples 1 to 3 showed a significantly reduced change in thickness, compared to each of the anodes obtained from Comparative Examples 1 to 4. Also, each of the anodes obtained from Examples 4 to 6 showed a smaller change in thickness, compared to each of the anodes obtained from Comparative Examples 5 to 8.

As described above, it is determined that the use of a composite according to the present invention, as an electrode active material, the composite containing, in an amount of about 10 to 10,000 ppm, the third material having a higher electrical conductivity than the second material, results in an improved electrical conductivity, compared to the use of a composite not containing the third material or a composite containing the third material in an amount greater or less than the above mentioned range. This significantly reduces expansion in a thickness of the electrode, increases a discharge capacity of the electrode, and further improves a life characteristic of a battery.

2) Each of electrode active materials coated with natural graphite, obtained from Examples 10 to 12 and Comparative Examples 11 to 14, showed a higher electrical conductivity, in comparison with each of electrode active materials not coated with natural graphite, obtained from Examples 1 to 3.

Meanwhile, each of the anodes obtained from Examples 10 to 12 showed a reduced expansion in thickness, compared to each of the anodes obtained from Examples 1 to 3, while each of the anodes obtained from Comparative Examples 11 to 14 showed a large change in thickness, compared to each of the anodes obtained from Examples 1 to 3.

Furthermore, the secondary batteries obtained from Examples 10 to 12 showed more improved life characteristics, compared to the secondary batteries obtained from Examples 1 to 3.

INDUSTRIAL APPLICABILITY

The composite according to the present invention comprises: a first material selected from the group consisting of metals and metalloids capable of being reversibly alloyed with lithium; a second material selected from the group consisting of metals incapable of being alloyed with lithium, compounds containing the metals, and compounds containing metals or metalloids capable of being irreversibly alloyed with lithium; and a third material which is at least one kind of metal having a higher electrical conductivity than the second material, wherein a content of the third material is adjusted in a predetermined range. The third material increases the electrical conductivity, thereby forming an electrical conducting path within the composite. This allows the volume of a battery to be uniformly changed during the charge/discharge. Thus, when the composite is used as an electrode active material for a secondary battery, it is possible to improve a life characteristic of the battery, and minimize a change in a thickness of the electrode.

The invention claimed is:

1. A composite comprising:
   a first material selected from the group consisting of metals and metalloids capable of being reversibly alloyed with lithium;
   a second material selected from the group consisting of metals incapable of being alloyed with lithium, compounds containing the metals, and compounds containing metals or metalloids capable of being irreversibly alloyed with lithium; and
   a third material which is at least one kind of metal having a higher electrical conductivity than the second material and which exists as a single-element material by being mixed with the first material and the second material without a chemical bond with the first material and the second material,
   wherein a content of the third material ranges from 10 to 10,000 ppm based on the total weight of the composite;
   the first material is selected from the group consisting of Si, Sn, Al, Sb, Bi, As, Ge, Pb, Zn, Cd, In, Tl and Ga;
   the second material is selected from the group consisting of:
   alloys of $M^1$ and $M^2$ ($M^1M^2$);
   a boron compound containing at least one of $M^1$ and $M^2$;
   a fluoride containing at least one of $M^1$ and $M^2$;
   a phosphide containing at least one of $M^1$ and $M^2$;
   a sulfide containing at least one of $M^1$ and $M^2$;
   an oxide containing $M^2$;
   an oxide containing $M^1$ and Li;
   wherein $M^1$ is selected from the group consisting of Si, Al, Sn, Sb, Bi, As, Ge and Pb; and
   $M^2$ is selected from the group consisting of Mg, Ca, Sc, Ti, V, Cr, Mn, Co, Ni, Cu, Fe, Li and Zn.

2. The composite as claimed in claim 1, wherein the third material is dispersed between the first materials, between the second materials, between the first material and the second material, or between all the materials.

3. The composite as claimed in claim 1, wherein the third material is iron (Fe).

4. The composite as claimed in claim 1, wherein the first material and the second material are included in a weight ratio of 10~90:90~10.

5. An electrode active material comprising the composite as claimed in claim 1.

6. The electrode active material as claimed in claim 5, wherein the third material is dispersed between the first materials, between the second materials, between the first material and the second material, or between all the materials.

7. The electrode active material as claimed in claim 5, wherein the third material is iron (Fe).

8. The electrode active material as claimed in claim 5, wherein the first material and the second material are included in a weight ratio of 10~90:90~10.

9. The electrode active material as claimed in claim 5, comprising a core comprising the composite; and a carbon layer formed partly or entirely on a surface of the core.

10. The electrode active material as claimed in claim 9, wherein the core and the carbon layer are included in a weight ratio of 98~10:2~90.

11. A secondary battery comprising the electrode active material as claimed in claim 5.

* * * * *